United States Patent [19]
Zayechek et al.

[11] Patent Number: 5,421,077
[45] Date of Patent: Jun. 6, 1995

[54] METHOD FOR THE SUBSTITUTION OF COPPER WINDINGS IN GENERATOR ROTOR FIELDS ORIGINALLY HAVING ALUMINUM WINDINGS

[75] Inventors: James F. Zayechek; Amy B. Russell, both of Clifton Park, N.Y.

[73] Assignee: General Electric Company, Schenectady, N.Y.

[21] Appl. No.: 245,268

[22] Filed: May 18, 1994

[51] Int. Cl.⁶ .................................... H02K 15/09
[52] U.S. Cl. ............................ 29/598; 29/401.1; 310/61; 310/215
[58] Field of Search ........... 29/596, 598, 401.1; 310/42, 61, 215

[56] References Cited
U.S. PATENT DOCUMENTS
4,859,891 8/1989 Jenkins et al. .

Primary Examiner—Carl E. Hall
Attorney, Agent, or Firm—Nixon & Vanderhye

[57] ABSTRACT

A method of replacing rotor windings of a dynamoelectric machine having aluminum windings with copper windings having the same number of coil turns and of about the same weight as the original aluminum windings wherein the copper rotor slot conductors are positioned at the top of the rotor slots and are supported in the slots by a U-shaped channel element to form an integral subslot for providing a supply of cooling gas to the windings. The copper windings, turn insulation, creepage block and slot wedges including aligned openings to form radially directed ventilation passages for directly cooling the windings by a flow of cooling gasses from the subslot through the radial passages to discharge in the airgap between the rotor and stator of the machine.

10 Claims, 3 Drawing Sheets

FIG. 3
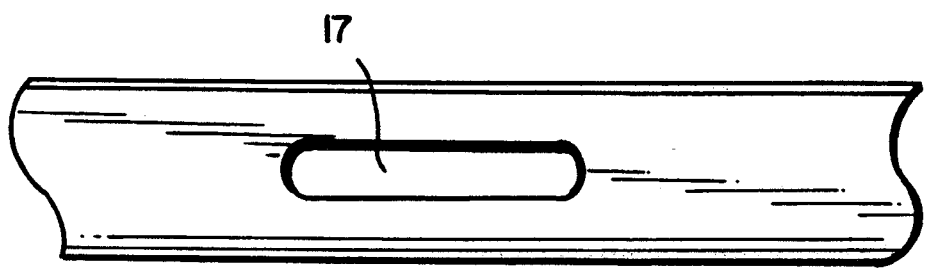
FIG. 4a
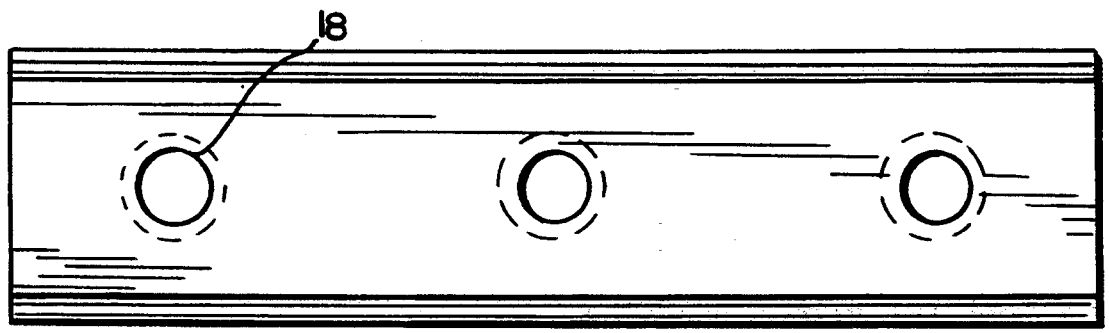
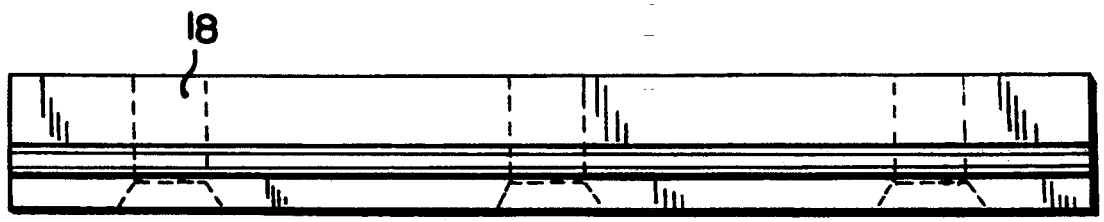
FIG. 4b

METHOD FOR THE SUBSTITUTION OF COPPER WINDINGS IN GENERATOR ROTOR FIELDS ORIGINALLY HAVING ALUMINUM WINDINGS

TECHNICAL FIELD

The invention relates to dynamoelectric machines and more particularly to the replacement of aluminum rotor windings with copper windings.

BACKGROUND

Due to the unavailability of an abundant supply of copper during periods of world conflict, electric generators which were built, for example, in the 1940's and early 1950's included aluminum or aluminum alloy field windings. The aging of such machines makes them prime candidates for extensive maintenance or complete rewinding as well as developing a need for effective methods for rewinding where necessary or desirable. That is to say, replacement of an original aluminum winding which is determined to be in good condition may not be necessary in that such windings may be reused with new field insulation installed. However, customer preference for copper may also require the replacement of the original aluminum windings. Moreover, where an original aluminum winding has been damaged, obtaining a suitable replacement alloy is not always possible or may involve substantial expense. Accordingly, replacement of original aluminum windings with appropriate copper substitutes is often necessary.

As will be appreciated by the artisan, such substitution to be effective and economically feasible is not as simple or as straightforward as it initially appears. For example, the use of aluminum field windings required the use of deep rotor slots in order to accommodate the approximately 80% increase in needed cross section for the windings. Additionally, since aluminum is approximately 35% as dense as copper, relatively thin or shallow rotor wedges were conventionally used. Furthermore, the use of a number of copper turns per coil, which is different than the number used in the original aluminum windings, would clearly have adverse effects on the field winding excitation requirements and thus require further modifications. Still further, the thermal performance of the rewound rotor should exhibit a performance at least equivalent to that of the original rotor with aluminum windings so as to eliminate extensive reevaluation and modifications pertaining to winding clearance requirements and cooling circuit capabilities.

Moreover, the mass of the substitute conductors should be approximately the same as the original windings in order to avoid over stressing of the wedges which serve to contain the windings within the rotor slots. In this regard, a substitute winding of copper, for example, may occupy only 50-60% of the original slot volume, while nevertheless weighing approximately the same as the original aluminum windings that have been replaced. However, prior attempts to simply replace the aluminum windings with copper located at the top of the existing rotor slots with the balance of the excess slot space occupied by fillers of insulating material, resulted in the rotor wedges having to restrain not only the copper winding, but also required restraint of the weight added by a stack of fillers. Thus, the addition of insulating fillers in the required quantities added significant weight and shear forces on the relatively thin rotor wedges. Such conditions resulted in over stressing both the rotor slot wedges, as well as the rotor teeth included in the rotor shaft drive mechanism. Still further, the fillers clearly present a significant barrier to the transfer of heat from the windings to the surrounding forged steel rotor, as well as serving as a barrier to cooling gases, such as air. Moreover, attempts to add conductor material for the purpose of reducing current density and hence a decrease in heating also serves to overload the rotor slot wedges and the rotor teeth.

DISCLOSURE OF THE INVENTION

We have discovered an effective technique using existing field insulation systems to provide a copper substitution for the original aluminum or alloy windings in a practical manner whereby the cross section of the replacement copper winding is minimized, while additionally providing superior thermal performance through the utilization of channel insulation elements formed to support the copper, as well as providing substantially a full width subslot below the windings so as to provide direct cooling of the conductors. That is to say, the integral subslot is formed so as to minimize the amount of fillers required, as well as providing direct cooling of the windings by way of the subslot and openings through the windings, as well as through vented wedges. Thus, a directly cooled field conversion is possible for producing improved thermal performance as well as avoiding the over stressing of the rotor slot wedges.

BRIEF DESCRIPTION OF THE DRAWINGS

These, as well as other objects and advantages will be better appreciated by a careful study of the following detailed description taken in conjunction with the accompanying drawings in which:

FIG. 3 illustrates a portion of a copper field winding including a ventilation slot for use in rotor slots as illustrated in FIG. 2;

FIGS. 4(a) and 4(b) are top and side views, respectively, of a rotor slot wedge including cooling air exhaust passages.

BEST MODE FOR CARRYING OUT THE INVENTION

Figure 1:
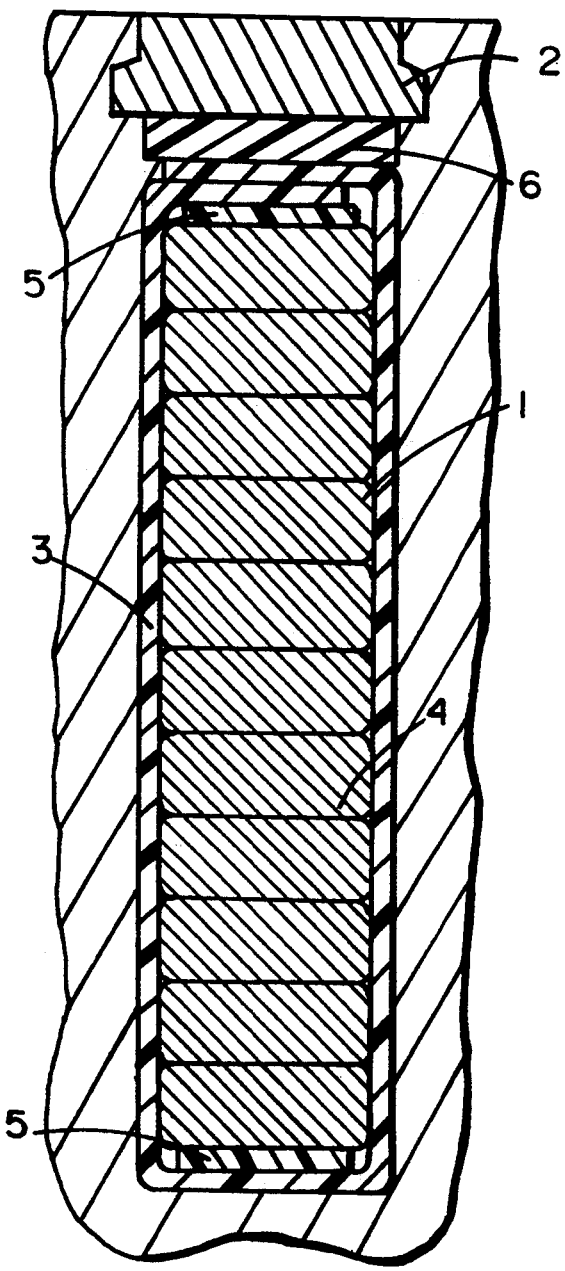
FIG. 1 is a cross sectional view of a prior art rotor slot with aluminum windings.

As may be seen from a consideration of a typical cross section of a rotor slot of a prior art generator with an aluminum or aluminum alloy winding, such windings 1 occupy substantially all of the available space in the rotor slot. Moreover, since the aluminum alloy used in the field windings had approximately one-half the conductivity of copper, the conductors require about 80% more cross sectional area in the slot than a copper equivalent. Accordingly, the rotor slots of such rotors were deeper than that which would be required for copper windings. Additionally, since the aluminum had about 35% of the mass density of copper for an equivalent cross section, relatively thin steel wedges 2 were used. Such slot structures additionally included slot insulation or armor 3, as well as turn insulation 4 to insulate the winding conductors from each other, as well as the steel rotor forging. Additionally included in such conventional rotor slot structures were insulating filling mediums 5, as well as a chafing strip 6, provided between the wedge and the remainder of the slot structure.

Figure 2:
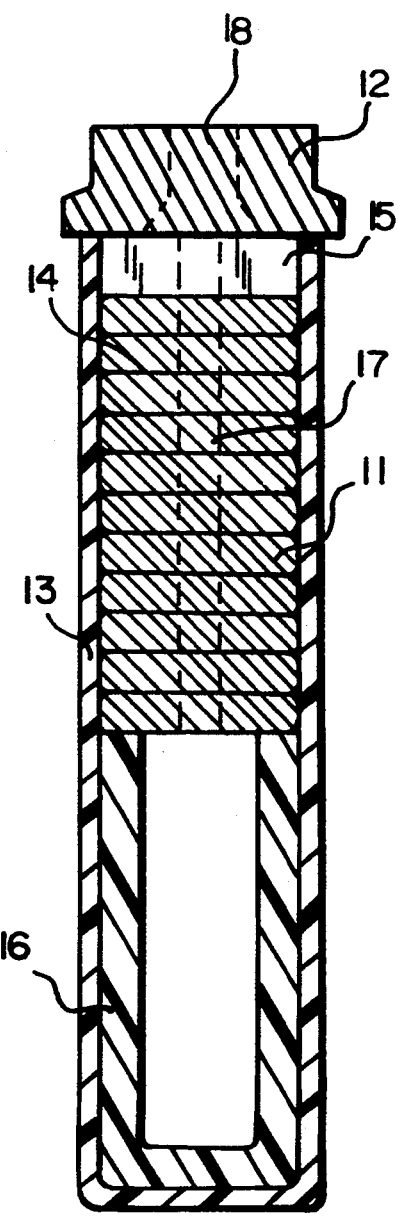
FIG. 2 is a cross sectional view of the rotor slot of FIG. 1 after substitution of copper windings for the aluminum.

Rewinding such rotor slots using substitute copper windings results in a slot structure as illustrated in FIG. 2, for example, where the substitute copper winding 11 although including the same number of turns per coil as the original winding also occupies about 50-60% of the original slot volume when substantially equal weights of copper, vis-a-vis, aluminum alloy are used. It is contemplated that such rotor structure may employ conventional molded slot insulation or armor 13 having a generally U-shaped cross section and contemporary turn insulation materials 14 for insulating the winding conductors from each other, as well as the rotor. Of additional benefit is the inclusion of a creepage block 15, formed from an insulating material such as grade G11 fiberglass composites, between the conductors and the wedge 12. The creepage block provides a longer path to ground for voltage buildup in the winding 11, and accordingly enhances insulation integrity.

The substitute copper windings must also be located at the top of the rotor slot just below the wedge and creepage block, and accordingly, an appropriate medium must be incorporated to fill the portion of the slot no longer needed for the new windings. As may be seen from FIG. 2, the use of a U-shaped subslot channel element 16 in addition to serving to support the windings and adding negligible weight, effectively converts the previously wasted space into an integral subslot through which cooling gases may be forced to flow by way of either fan or self-pumping design arrangements known to the artisan. The subslot channel element can be formed from conventional insulating material, preferably meeting ANSI Class F temperature requirement and ASTM D709 strength requirements, such as fiberglass by conventional methods such as molding, extrusion, or composite lay-up. The subslot 16 not only minimizes the use of filler, but also provides the opportunity to utilize the thus formed subslot to directly cool the copper by way of inclusion of radially directed ventilation slots 17 in the copper conductors. Thus, the present method in addition to effectively substituting copper windings for the prior art aluminum alloy field winding conductors also contemplates conversion to directly cooled field windings having improved and more uniform thermal performance characteristics.

Figure 5:
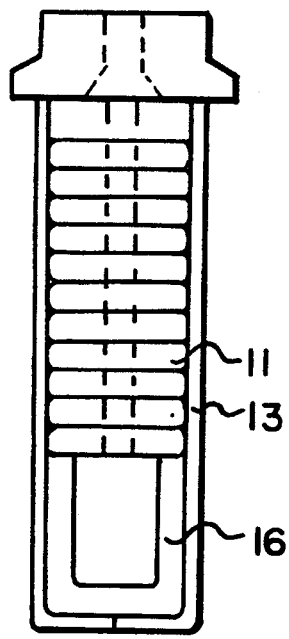
FIGS. 5-8 illustrate a portion of a copper field winding including a ventilation slot for use in rotor slots as illustrated in FIG. 2, and various configurations for the slot armor and subslot channel.
Figure 6:
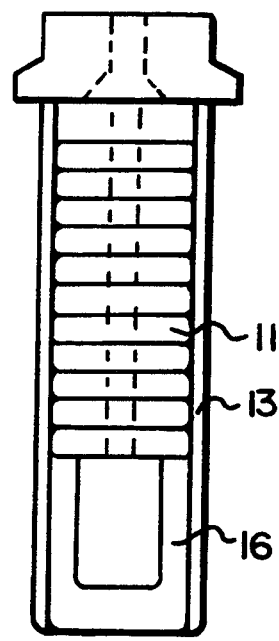
Figure 7:
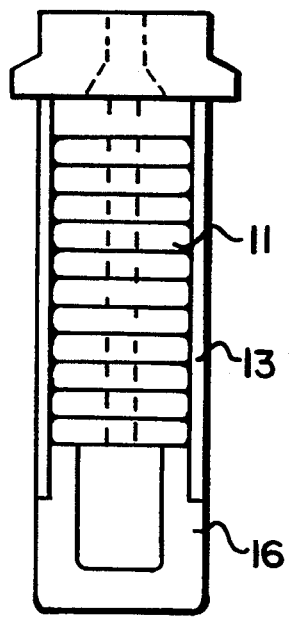
Figure 8:
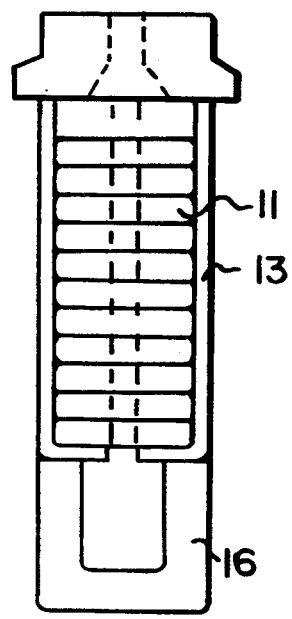

The method of this invention provides the subslot channel 16 to support the conductor windings 11, and suitable slot armor 13 to minimize voltage buildup creepage from the conductor windings 11 to the rotor slot. Therefore, other configurations of the subslot channel and slot armor to provide such support and minimzed voltage buildup creepage are within the contemplation of this invention. For example, FIG. 5 shows two L-shaped sections of slot armor 13 forming the U-shaped slot armor. FIG. 6 shows slot armor 13 extending along the sides of the slot, and the subslot channel 16 extending from the bottom of the slot to the windings 11. FIG. 7 shows the slot armor 13 mortised into the subslot channel 16 a sufficient to minimize the voltage buildup creepage. FIG. 8 shows slot armor 13 having an L-shape extending between the conductor 11 and the subslot channel 16.

FIG. 3 illustrates an exemplary ventilation opening located uniformly along the length of the rotor winding copper conductors. Preferably, the opening is elongated to provide increased surface area for better cooling of the conductor. Similar openings would be included in the turn insulation 14 which is bonded between the conductors, as well as similar openings in the creepage block 15. By properly aligning all of the ventilation openings through the turn insulation, copper conductors and creepage block as the winding and other elements are stacked in the rotor slot, cooling passages are provided so that cooling gases supplied by way of the subslot may flow through the rotor windings in a radial direction toward the airgap between the rotor and stator.

To complete the radial cooling paths between the airgap and the subslot for the direct cooling of the rotor winding conductors, holes in the slot wedges of the exemplary nature illustrated in FIGS. 4(a) and 4(b) may be used. Preferably, the holes are circular to minimize stress concentration and crack initiation sites in the wedges. Preferably, the creepage block has openings formed to transition from the elongated openings in the conductors to the circular openings in the wedges. The length of the vent wedges is coordinated with the number of winding vents and their spacings. A uniform axial spacing of the cooling vents along the axial length of the rotor provides good thermal performance, as well as providing the advantage of ease of manufacture.

The present method provides an effective technique for replacing an aluminum winding with one made of copper wherein the replacement winding will have the same number of turns per coil as the original winding while maintaining substantially equal conductor mass and enhanced thermal performance. As will be appreciated by those skilled in the art, maintaining a constant number of turns per coil will prevent adverse effects on the field winding excitation requirements. Moreover, the maintenance of at least equivalent thermal performance avoids the necessity of completely reevaluating winding clearance requirements and cooling circuit capabilities. Additionally, the use of copper windings of substantially the same weight as the aluminum or aluminum alloy windings being replaced avoids over stressing of the slot wedges which serve to maintain the windings within the rotor slots. Furthermore, the inclusion of a fiber glass U-shaped channel element, as well as radial ventilation openings through the conductors, insulation and wedges provide uniform and improved thermal performance by establishing an integral subslot and cooling gas passages for directly cooling the new field copper. Still further, the presently disclosed method provides an economical technique for rewinding such existing rotors through the use of commonly available materials, such as existing insulation systems and manufacturing processes without requiring expensive modifications to the generator excitation system. For example, the U-shaped channel element 16 may be of conventional insulating material but dimensioned so as to support the replacement copper windings at the top of the rotor slot while simultaneously forming the integral subslot. The subslot channel element may be about 0.100 inches thick and be bonded to the slot armor 13. However, extremely deep subslots may require the use of thicker material to form the subslot channel element. Thus, it is believed that the herein disclosed technique may be used to efficiently replace the field windings for existing machines having aluminum or aluminum alloy windings wherein the original aluminum windings have been damaged or exhibit anomalies such as high average winding temperature or hot spots near the center of the field windings.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of replacing aluminum or aluminum alloy windings in rotor slots of a dynamoelectric machine with copper windings, the aluminum or aluminum alloy windings including turn insulation and a preselected number of coil turns, the rotor slots including wedges for restraining the windings within the slots, said method comprising:

removing said aluminum or aluminum alloy windings, turn insulation and slot wedges;

installing copper windings including turn insulation in said rotor slots, the copper windings including said preselected number of coil turns and having a weight which is approximately equal to the removed aluminum or aluminum alloy windings;

supporting the copper windings in a top portion of the rotor slot with a channel element provided in a bottom portion of the rotor slot to form subslot portions in the rotor slots for supplying cooling gasses to the copper windings;

installing wedges in the rotor slots for restraining the copper windings in the rotor slots; and providing openings in said copper windings, turn insulation and wedges, which are aligned so as to form passages from said subslot portions to an airgap between the rotor and a stator of the dynamoelectric machine, said passages being radially directed with respect to the rotor, whereby the copper windings are directly cooled by cooling gasses passing between said subslot portions and said airgap.

2. A method as in claim 1 wherein said rotor slots include a bottom wall and side walls and said method further includes providing slot armor insulation between said side walls and the copper windings.

3. A method as in claim 2 wherein said slot armor insulation is U-shaped and is provided so as to cover said side walls and said bottom wall.

4. A method as in claim 1 wherein a said channel elements are formed of U-shaped insulating material.

5. A method as in claim 2 wherein said channel element is provided in each rotor slot adjacent the slot armor insulation, said channel elements being formed of U-shaped insulating material.

6. A method as in claim 3 wherein said channel element is formed of U-shaped insulating material and is bonded to said slot armor insulation.

7. A method as in claim 1 further including:

providing an insulating creepage block between the copper windings and each slot wedge whereby a creepage path between the copper windings and the rotor is increased, said creepage block including openings aligned with said passages.

8. A method as in claim 1 wherein said copper windings fill about 50 to 60% of a rotor slot and said channel element is formed of U-shaped insulating material and is dimensioned to support the copper windings in said top portion of the rotor slots.

9. A method as in claim 1 wherein said openings in the copper windings and turn insulation are formed in the shape of elongated slots and wherein said passages are uniformly spaced along an axial length of the rotor.

10. A method as in claim 7 wherein said openings in the copper windings, turn insulation and creepage block are formed in the shape of elongated slots and said passages are spaced uniformly along an axial length of the rotor.

* * * * *